July 21, 1959
R. A. FINDLAY
2,895,835
SEPARATION BY CRYSTALLIZATION
Filed June 28, 1954
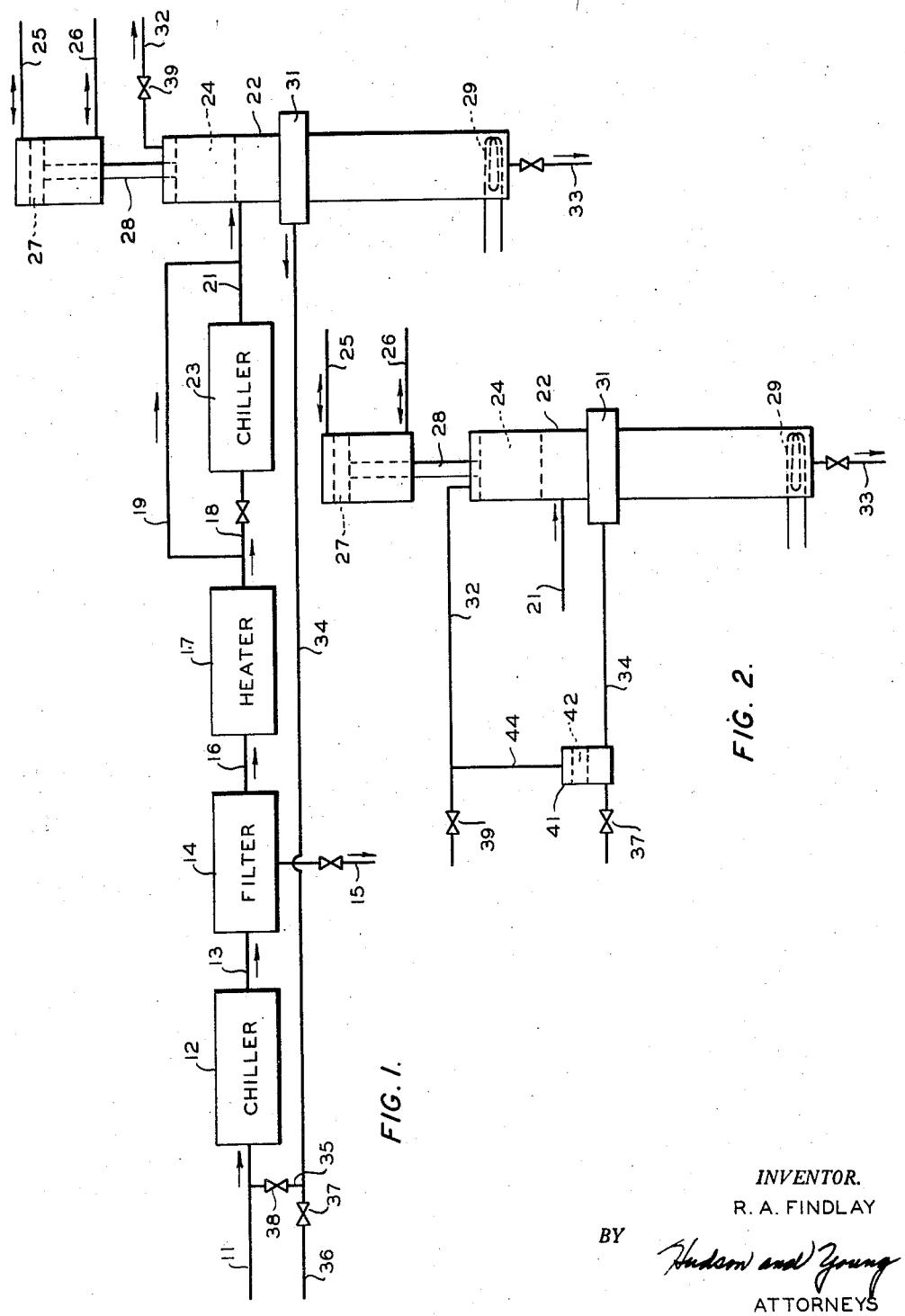
*INVENTOR.*
R. A. FINDLAY
BY
*Hudson and Young*
ATTORNEYS

United States Patent Office 2,895,835
Patented July 21, 1959

2,895,835

SEPARATION BY CRYSTALLIZATION

Robert A. Findlay, Bartlesville, Okla., assignor to Phillips Petroleum Company, a corporation of Delaware Application June 28, 1954, Serial No. 439,734

4 Claims. (Cl. 99—199)

This invention relates to separation by crystallization. In one of its more specific aspects, the invention relates to improved apparatus for the separation of components of mixtures by fractional crystallization. In another of its more specific aspects, the invention relates to an improved method for separating the components of liquid mixtures by fractional crystallization.

This application is a continuation-in-part of my United States patent application Serial No. 176,505, filed July 28, 1950, and now Patent Number 2,683,178.

Separations of compounds may be effected by distillation, solvent extraction and crystallization. Although distillation and extraction are generally preferred because of economy and convenience of operation, there are some instances in which such processes cannot be successfully utilized. Many chemical isomers have similar boiling points and solubilities and cannot be separated satisfactorily by distillation or extraction. Separation by means of fractional crystallization can be satisfactorily utilized in many cases in making such separations. Fractional crystallization has one great advantage over other methods of separation in that it is the only separation method which theoretically offers a pure product in a single stage of operation in systems in which the desired component of a mixture solidifies at temperatures above which the other components solidify. Thus, whereas distillation and extraction theoretically require infinite stages for a pure product, crystallization in many cases requires only one. This is because of phase equilibrium in distillation and extraction, while by crystallization, substantially pure crystals can be separated from many solutions in one stage, regardless of the liquid composition. Thus, whereas separation by distillation and extraction becomes more difficult as the purity of the product increases, separation by crystallization becomes easier.

Crystallization is thus well suited, not only to the separation of many chemical isomers which can be separated by no other means, but also to the purification of many compounds which cannot be economically purified by other means. Whereas one stage of crystallization theoretically offers a pure product, attainment of this ideal stage has been difficult. Complete removal of occluded impurities without substantial loss in yield is required. This invention results in a very close approach to the ideal crystallization stage.

A method of separating a pure component from a mixture has been devised whereby the mixture to be separated is introduced into a heat exchange zone wherein a slurry of crystals is formed and that slurry of crystals is then introduced into an elongated purification chamber through which the crystals are moved as a compact mass. As disclosed by J. Schmidt, Re. 23,810, and by D. L. McKay in application Serial No. 375,850, filed August 24, 1953, the mass of crystals is then moved through the column to a melting zone wherein the crystals are melted. A portion of liquid corresponding to the melt is caused to move countercurrently through at least a portion of the crystal mass so as to displace occluded impurities from the crystal mass approaching the melting zone. The exact mechanism whereby this displaced liquid corresponding to the melt improves the purity of the final product is not completely understood. However, it is presently believed that the substantially pure material which is refluxed through at least a portion of the crystal mass displaces the mother liquor from the crystal mass approaching the melting zone and replaces the mother liquor in the interstices of the crystal mass. A high yield of product is obtained since the high melting product refreezes from the reflux stream as it comes in contact with the cold crystal mass moving toward the melting zone. Thus, the portion of the crystal mass which approaches the melting zone does not contain any appreciable amount of impurities and the resulting product which is removed from the melting zone is of extremely high purity.

In order to make some separations of the constituents of a mixture by fractional crystallization, it is necessary to adjust the temperature of the mixture to one which is far below the solidification point of the pure desired constituent. For example, when para-xylene is separated from a mixture of isomeric alkyl benzenes, it is necessary to cool the mixture to a temperature in the neighborhood of about −57° to about −76° C., depending upon the concentration of the constituents in the mixture, in order to crystallize an optimum amount of the para-xylene. When the crystals of para-xylene are introduced into a purification chamber wherein they are moved as a compact mass through the length of the chamber to a melt zone in a manner so as to displace a portion of the melt through at least a portion of the crystal mass, considerable difficulty is encountered. The substantially pure material obtained by melting crystals in the melt zone has, in many instances, such as in the case of para-xylene, a freezing point which is much higher than the temperature at which the crystals must be formed when in admixture with the other liquid components. For example, pure para-xylene has a freezing point of about 13° C. When such a high freezing point material is displaced through at least a portion of a crystal mass which is at a temperature much lower than the freezing point of that material, the relatively pure material freezes in the interstices of the crystal mass and completely closes off further flow of the melt through the compacted crystal mass. I have devised a method whereby continuous operation can be achieved at a high rate without encountering freezing of a solid impervious crystal plug in the purification column. This problem is, to my knowledge, only encountered in a system using a purification tube, such as is described hereinafter. This improvement is particularly important, since it results in a higher rate of recovery of a product of a purity which is higher than has been obtained with other types of fractional crystallization systems.

Liquid which is displaced from the crystal mass is removed from the purification chamber through a filter in an upstream portion of the chamber. The filter may be either in the wall of the chamber or may be in the form of a porous face of the piston used to move the crystals as a compact mass in a downstream direction through the purification column, or both types of filter can be used. When operating at the relatively low temperatures at which such crystal purification systems are operated, considerable difficulty is encountered in maintaining the filter surface open to the flow of liquid material. I have found that there is a tendency for crystalline material to be forced into the pores of the filter, thus materially reducing the filter area through which liquid can be removed from the chamber. I have devised a method whereby continuous operation of such an elongated purification chamber can be operated continuously at a high rate without clogging of the filter area.

The following are objects of the invention.

An object of the invention is to provide an improved system for the separation of a pure component from liquid mixtures. Another object of the invention is to provide an improved process for the separation of a pure component from a liquid mixture. Another object of the invention is to provide a system, including a filter, for separating crystalline and non-crystalline material in which the filter is maintained open for the flow of liquid therethrough. Another object of the invention is to provide a method for freeing a filter of a crystallization system of crystalline material. Another object of the invention is to provide a method for rapidly separating a component having a relatively high solidification point from a mixture which has a relatively low eutectic solidification point. Another object of the invention is to provide a process which will permit the continued displacement of pure material through at least a portion of a compacted crystal mass. Other and further objects of the invention will be apparent to those skilled in the art upon study of the accompanying disclosure.

Broadly speaking, this invention resides in clearing the filter area of crystalline material during the operation of a crystal purification chamber through which crystals are moved as a compact mass, as is more fully described hereinafter. The filter or filters are back-washed with liquid removed from the purification chamber by intermittently establishing a pressure differential between the downstream and upstream sides of the filter or filters. Thus, when such a pressure differential is established, a sufficient amount of the liquid which has been removed from the system flows back through the filter, dislodging crystalline material which has tended to close off the filter or filters.

Although, as I have pointed out hereinbefore, this invention is particularly applicable to systems in which the solidification point of the desired pure component is considerably higher than the temperature to which the component is cooled in the liquid mixture to form crystals thereof, this procedure can be advantageously utilized in practically any system to which fractional crystallization is applicable so as to increase the efficiency of the process. This invention is advantageous when applied to separations in many multi-component systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say, 15 to 25 percent purity, so as to effect a purity upwards of 98 percent. In order to illustrate some of the systems to which the invention is applicable, the following compounds are grouped with respect to their boiling points.

| Group A | B. P., °C. | F. P., °C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B. P., °C. | F. P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (Isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B. P., °C. | F. P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B. P., °C. | F. P., °C. |
|---|---|---|
| Aniline | 184.4 | −6.2 |
| Toluene | 110.8 | −95 |
| Benzene | 80.0 | 5.5 |

| Group E | B. P., °C. | F. P., °C. |
|---|---|---|
| Carbon tetrachloride | 77 | −22.8 |
| Chloroform | 61 | −63.5 |
| CS₂ | 46.3 | −108.6 |
| Acetone | 56.5 | −95 |

| Group F | B. P., °C. | F. P., °C. |
|---|---|---|
| Ortho-xylene | 144 | −27.1 |
| Meta-xylene | 138.8 | −47.4 |
| Para-xylene | 138.5 | 13.2 |

| Group G | B. P., °C. | F. P., °C. |
|---|---|---|
| Ortho-cymene | 175.0 | −73.5 |
| Meta-cymene | 175.7 | <−25 |
| Para-cymene | 176.0 | −73.5 |

| Group H | B. P., °C. | M. P., °C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B. P., °C. | M. P., °C. |
|---|---|---|
| Ortho-nitrotoluene | 222.3 | α −10.6 / β −4.1 |
| Meta-nitrotoluene | 231 | 15.5 |
| Para-nitrotoluene | 238 | 51.3 |

Systems consisting of any combination of two or more of the components within any one of the groups may be separated by the process of the invention, as well as systems made up of components selected from different groups; for example, benzene may be separated from a benzene-n-hexane or n-heptane system in which the benzene is present in an amount greater than the eutectic concentration. In the same manner, para-xylene may be readily separated from a mixture of para- and meta-xylenes, or from para-, meta-, and ortho-xylenes. Benzene may also be separated from a mixture with toluene and/or aniline. Multicomponent systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene, hydroquinone (1,4-benzenediol), paracresol, paradichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

A more complete understanding of this invention will be obtained on study of the accompanying drawings, in which:

Figure 1 is a schematic representation of the fractional crystallization system of this invention; and Figure 2 is a section view of a modified system of this invention.

Referring particularly to Figure 1 of the drawings, a mixture of materials from which at least one constituent is to be separated is fed through conduit 11 to a heat exchanger, such as chiller 12, where the temperature of the mixture is adjusted so as to obtain crystals of at least a portion of at least one of the constituents of the mixture. Chiller 12 can be any conventional type chiller, preferably being of the scraped surface type which is supplied with refrigeration means that are adequate to lower the temperature of the liquid mixture to that necessary to crystallize at least a portion of at least one of the constituents thereof. As will be apparent from the discussion hereinbefore, the temperature to which the mixture is adjusted in the heat exchanger will depend entirely upon the specific mixture, since the various materials solidify at different temperatures and the temperatures at which any given constituent of a mixture will solidify is dependent upon the constitution of the mixture. When a mixture of isomeric $C_8$ alkyl benzenes is fed through conduit 11 to chiller 12, that mixture is lowered to a temperature in the neighborhood of $-57°$ to $-76°$ C. When the desired product is relatively dilute in the feed stream, the range of temperatures at which crystals will form will be relatively low. If the desired product is relatively concentrated in the feed, crystals thereof will form at relatively high temperatures. When materials having a high crystallization temperature are handled, the heat exchanger may be a heater rather than a chiller.

If desired, crystals can be formed by introducing a low boiling liquefied refrigerant into the heat exchange chamber, together with the liquid mixture from which a component is to be separated, and vaporizing the refrigerant, thereby causing cooling of the liquid mixture with concomitant crystallization of the high freezing point component of the mixture. The vaporized refrigerant can then be removed directly to a compression zone where it is reliquefied by compression and subsequently cooled.

The slurry resulting from chilling of the liquid mixture is fed through conduit 13 to filter 14 wherein uncrystallized material is separated from the crystals through conduit 15. The amount of uncrystallized material (mother liquor) which is left on the crystals is dependent upon the specific type of filter which is utilized. Any one of several different types of filters can be used for this step in any process. However, in order to obtain the highest possible efficiency, I prefer to use a piston type filter-purification chamber, such as the one more fully described hereinafter. The combination of two such filter-purification chambers is disclosed by D. J. Quigg in U.S. application Serial No. 443,512, filed July 15, 1954, and by J. A. Weedman in U.S. application Serial No. 462,828, filed Oct. 18, 1954. By using such a combination, modified as described hereinafter, I am able to maintain all of the filter area of a system substantially free of crystalline material. Crystals are removed from filter 14 through conduit 16 to a heating tank 17. The crystals are heated to such an extent that a portion of the crystals is melted and, in that manner, the crystal mass is diluted and warmed. It is preferred to melt a sufficient amount of the crystals to form a mixture which has a solids content of not more than 45 percent by weight. It is preferred that the material from chamber 17 have a solids content of 35 to 45 percent by weight. In such an operation, the resulting mixture is removed from heater 17 and is passed through conduits 18, 19 and 21 into the upstream portion of purification chamber 22. In another modification, the crystals are heated to a higher temperature in heater 17 so as to reduce the solids content to not greater than 10 per cent by weight. Operating in this latter manner facilitates better control of the temperature at which crystals are eventually introduced into purification chamber 22. When the solids content of the mixture is lowered below 35 percent by weight, the material is passed by means of conduit 18 to chiller 23 wherein the mixture is cooled so as to form a mixture having a solids content of between 35 and 45 percent by weight.

As the crystals are introduced into chamber 22, piston 24 is actuated by the flow of motivating fluid through conduits 25 and 26, acting on motivating piston 27 connected to piston 24 by piston rod 28 so as to reciprocate piston 24 in chamber 22. In this fashion, the crystals are moved as a compact mass in a downstream direction toward heating element 29. Heating element 29 may be in the form of heating coils within chamber 22 or may be in the form of a heating element closely surrounding the lower portion of chamber 22 or may be provided in the bottom surface of that column, or may be of any other conventional heater design.

A filter 31 is provided in the upstream portion of chamber 22. This filter is designed so as to permit the removal of liquid from the crystal mass by displacement and by compaction. Piston 24 can be imperforate, in which case all of the liquid displaced from the crystal mass is removed from chamber 22 through filter 31. As an alternative, however, piston 24 can be provided with a perforate downstream face, which perforate face permits the passage of liquid material therethrough while moving the crystals in a downstream direction. When piston 24 is of the perforate type, liquid which is removed through that piston is removed from chamber 22 through conduit means, such as conduit 32. Purified product is removed from the downstream end portion of melting section of chamber 22 through conduit 33. Although the purified product is preferably removed in a melted form, that product can be removed at least partially as a solid, if desired.

Liquid material which is removed from chamber 22 through filter 31 is removed through conduit 34. The disposition which I make of the liquid material removed through filter 31 or conduit 32 depends to a large extent upon the amount of crystals melted while bringing the crystal mass to a relatively warm temperature in heating chamber 17 or the concentration of the desired component in the liquid removed from chamber 22 through the filters. It is preferred to operate the system so that the liquid which is removed through filter 31 or through conduit 32 is enriched in the component which is being purified in chamber 22, compared to the feed introduced through conduit 11. Because the liquid is enriched in that component, that liquid is suitable for return to chiller 12 together with the feed mixture supplied through conduit 11. The liquid is returned through conduits 34 and 35. In this fashion, larger crystals of the desired product are formed in the chiller, which larger crystals are more easily processed in this system. When the concentration of the desired component in the liquid removed from chamber 22 is not higher than that in a mixture fed through conduit 11, that liquid is not sufficiently enriched in the desired product to benefit the feed. In such a situation, that liquid is usually removed through conduit 36 and/or conduit 32 and can be discarded, or in the case of some mixtures, such as the isomeric alkyl benzenes, it can be isomerized to produce additional desired products.

In one aspect of my invention, I produce intermittently a pressure differential, generally in the range of from 1 to 7 p.s.i., across the filter in filter 31 and in piston 24, by maintaining a back pressure on the liquid being removed through conduits 34 and/or 32. Such a back pressure is conveniently maintained by means of valves 37, 38 and 39. A less flexible way of maintaining a back pressure is by introducing the liquid into the lower portion of a storage tank in which a considerable head of liquid is maintained. Thus, in a piston type chamber, as piston 24 is moved in an upstream direction, pressure is reduced in the area between the upstream end of the compact crystal mass and the downstream end of piston 24. Liquid is caused to flow back through the filter by reason of the resulting pressure differential, thereby removing crystalline material from the filter.

Referring particularly to Figure 2 of the drawings, parts like those described in connection with Figure 1 are designated by like numerals. In this modification, pulsation chamber 41 is connected to conduit 34. This chamber is provided with a piston 42 which is slideably positioned in that chamber, being adapted to slide within chamber 41 while preventing the passage of liquid material around or through that piston. Chamber 41 is connected at one end portion to conduit 34 while the other end portion of that chamber is connected by means of conduit 44 to conduit 32. Liquid which is removed from chamber 22 during that movement of piston 24 in its downstream direction is passed through conduit 34. The movement of piston 24 in its downstream direction causes the liquid to flow through conduit 34 under such pressure as to move piston 42 in a direction away from conduit 34 and to fill the lower portion of that chamber with such liquid. As piston 24 moves in an upstream direction, liquid which has been displaced through piston 24 is moved through conduit 32 and a portion thereof back-washes the filter in the face of piston 24 and also causes piston 42 to move toward conduit 34, thus causing a surge of liquid in conduit 34 so as to provide an impulse of liquid to assist in back-washing filter 31.

In order to better illustrate my invention, I have provided the following example which exemplifies this invention but should not be construed to unduly limit the same. The percentages used herein are percentages by weight.

*Example*

A feed mixture comprising 17 percent para-xylene, 17.5 percent ortho-xylene, 33.4 percent meta-xylene, 27.5 percent ethyl benzene and 4.6 percent toluene is supplied to the system at a rate of 1000 gallons per hour through conduit 11. Liquid material recovered as displaced liquid from chamber 22 through filter 31 comprises 53.1 percent para-xylene, 9.8 percent ortho-yylene, 18.7 percent meta-xylene, 15.6 percent ethyl benzene and 2.8 percent toluene. A back pressure is maintained on the liquid material recovered from chamber 22 through filter 31 and conduit 34. This stream is supplied to chiller 12 at 165 gallons per hour together with the feed stream described hereinabove. The resulting composite feed comprises 22.1 percent para-xylene, 16.3 percent ortho-xylene, 31 percent meta-xylene, 26.2 percent ethyl benzene and 4.4 percent toluene at 1165 gallons per hour. That material is lowered to a temperature of —76° C. with the resultant formation of 15.1 percent solids. The slurry of mother liquor and crystals is passed to filter 14 wherein mother liquor having a para-xylene content of 6.75 percent is removed through conduit 15 at a rate of 890 gallons per hour. The crystalline material from which the mother liquor has been removed is 70 percent solids and is at a temperature of —76° C. That material is supplied to heating chamber 17 wherein the crystal mass is heated to a temperature of —23° C. and a stream of 40 percent solids at that temperature is moved through conduits 18, 19 and 21 to purification chamber 22 at a rate of 275 gallons per hour. The crystals are moved downstream through chamber 22 as a compact mass by means of the intermittent strokes of piston 24. As the crystals are moved to the heating zone, the crystals are melted and a portion of the melt is displaced upstream through the compact crystal mass. A product which is about 99 percent para-xylene is removed through conduit 33 at a rate of 110 gallons per hour. As piston 24 is moved in an upstream direction, a zone of lower pressure is created between the upstream end of the compact crystal mass and the face of the piston so that a pressure differential exists across filter 31, e.g., a pressure differential of 5 p.s.i. and liquid in conduit 34 is caused to flow back through that filter, thereby washing the filter substantially free of crystalline material.

It will be apparent to those skilled in the art that various modifications of this invention can be made upon study of the accompanying disclosure. Such modifications are believed to be clearly within the spirit and the scope of this invention.

I claim:

1. A process for purifying an impure crystalline material, which comprises intermittently moving an elongated compact mass of impure crystals through an elongated confined displacement zone toward a melting zone at one end thereof by the reciprocating movement of a piston spaced upstream from said melting zone; melting crystals in said melting zone; displacing a portion of resulting melt countercurrently through at least a portion of said compact mass of impure crystals so as to displace liquid therefrom; removing displaced liquid from an upstream portion of said displacement zone through filter means; maintaining a back pressure on said displaced liquid so removed so as to cause a back flow of said displaced liquid through said filter means upon the back stroke of said piston so as to dislodge any crystalline material from said filter means; and removing purified product from said melt zone.

2. A process for purifying an impure crystalline material, which comprises intermittently moving an elongated compact mass of impure crystals through an elongated confined displacement zone toward a melting zone at one end thereof by the reciprocating movement of a piston spaced upstream from said melting zone; melting crystals in said melting zone; displacing a portion of resulting melt countercurrently through at least a portion of said compact mass of impure crystals so as to displace liquid therefrom; removing displaced liquid from said crystal mass through filter means in the wall of said displacement zone and filter means in the face of said piston; collecting a portion of said displaced liquid removed through the filter means in the wall of said displacement zone in a reservoir; rapidly ejecting said liquid collected in said reservoir in response to pressure applied by said piston to the liquid removed through said piston so as to apply a surge of said displaced liquid back through said filter means so as to dislodge any crystalline material therefrom; and removing purified product from said melt zone.

3. A process according to claim 2 wherein said displaced liquid is forced back through said filter means under a differential pressure in the range 1 to 7 p.s.i.

4. Apparatus for crystal purification which comprises a tube; a melting chamber in communication with one end of said tube; heating means operatively connected to said melting chamber; a product outlet from said melting chamber; a crystal inlet spaced upstream from said melting chamber; piston means in said tube adapted to reciprocate therein so as to move said crystals as a compact mass through said tube toward said melting chamber; first filter means in the face of said piston; second filter means in the wall of said tube, spaced upstream from said melting chamber; first conduit means extending from said filter means in the wall of said tube; a reservoir chamber connected to said first conduit means; piston means fitted in said reservoir chamber so as to reciprocate therein but so as to prevent the flow of liquid around said piston; second conduit means connected to said tube upstream of said filter in said piston and connected to said reservoir chamber at the end opposite that connected to said first conduit so that liquid moved through said second conduit means acts against one side of said piston and liquid moved through said first conduit means acts against the other side of said piston.

References Cited in the file of this patent

UNITED STATES PATENTS

| | | |
|---|---|---|
| 2,239,612 | Lawlor | Apr. 22, 1941 |
| 2,337,385 | Gross | Dec. 21, 1943 |
| 2,475,968 | Jokel | July 12, 1949 |
| 2,603,667 | Pankratz et al. | July 15, 1952 |
| 2,613,136 | McKay | Oct. 7, 1952 |
| 2,615,793 | Weedman | Oct. 28, 1952 |
| 2,622,115 | Carney | Dec. 16, 1952 |
| 2,683,178 | Findlay | July 6, 1954 |
| 2,731,456 | Weedman | Jan. 17, 1956 |
| 2,747,001 | Weedman | May 22, 1956 |
| 2,752,230 | Findlay | June 26, 1956 |